(12) United States Patent
Matsuo et al.

(10) Patent No.: US 10,118,619 B2
(45) Date of Patent: Nov. 6, 2018

(54) VEHICLE CONTROL DEVICE AND CONTROL METHOD

(71) Applicant: TOYOTA JODOSHA KABUSHIKI KAISHA, Toyota-shi, Aichi-ken (JP)

(72) Inventors: Kenji Matsuo, Toyota (JP); Akira Hino, Toyota (JP); Hiroki Kondo, Miyoshi (JP); Mitsuhiro Fukao, Toyota (JP); Daisuke Inoue, Toyota (JP); Atsushi Ayabe, Toyota (JP); Hiromitsu Nitani, Nagakute (JP); Kazuya Sakamoto, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 130 days.

(21) Appl. No.: 15/507,455

(22) PCT Filed: Aug. 27, 2015

(86) PCT No.: PCT/IB2015/001545
§ 371 (c)(1),
(2) Date: Feb. 28, 2017

(87) PCT Pub. No.: WO2016/030745
PCT Pub. Date: Mar. 3, 2016

(65) Prior Publication Data
US 2017/0305428 A1  Oct. 26, 2017

(30) Foreign Application Priority Data
Aug. 29, 2014 (JP) ................................ 2014-1785852

(51) Int. Cl.
*B60W 10/30* (2006.01)
*B60W 30/18* (2012.01)
(Continued)

(52) U.S. Cl.
CPC ...... *B60W 30/18018* (2013.01); *B60W 10/02* (2013.01); *B60W 10/06* (2013.01);
(Continued)

(58) Field of Classification Search
CPC ........... Y10T 477/638; Y10T 477/6433; F16D 25/061; F16D 25/14; F16D 2048/0233;
(Continued)

(56) References Cited

U.S. PATENT DOCUMENTS 7,946,952 B2 *  5/2011  Vogel .................. F16H 61/0028
477/7
9,925,982 B2 *  3/2018  Schiele ........... B60W 30/18072
(Continued)

FOREIGN PATENT DOCUMENTS

EP   1 961 999 A2   8/2008
JP   2004-270891 A   9/2004
(Continued)

*Primary Examiner* — Roger L Pang
(74) *Attorney, Agent, or Firm* — Oliff PLC (57) ABSTRACT

In a control device for a vehicle including: a dog clutch mechanism that is disposed in a power transmission path in which a driving force is transmitted from an engine to a wheel and is operated by a hydraulic actuator; and an electric oil pump that supplies hydraulic pressure to the hydraulic actuator, rotation of the engine is stopped in a state in which the dog clutch mechanism is engaged by the hydraulic pressure supplied from the electric oil pump at a time during an engine stop operation, the rotation of the engine is started in the state in which the dog clutch mechanism is engaged by the hydraulic pressure supplied from the electric oil pump at a time during an engine restart operation, hence occurrence of up-lock of the dog clutch mechanism is prevented.

5 Claims, 9 Drawing Sheets

(51) Int. Cl.
  *B60W 10/02* (2006.01)
  *B60W 10/06* (2006.01)
  *F16D 48/02* (2006.01)
  *F16D 25/061* (2006.01)

(52) U.S. Cl.
  CPC ..... *B60W 10/30* (2013.01); *B60W 2510/0208* (2013.01); *B60W 2510/0638* (2013.01); *B60W 2510/1005* (2013.01); *B60W 2510/30* (2013.01); *B60W 2710/021* (2013.01); *B60W 2710/06* (2013.01); *B60W 2710/30* (2013.01); *F16D 25/061* (2013.01); *F16D 25/14* (2013.01); *F16D 2048/0233* (2013.01); *F16D 2048/0245* (2013.01); *Y10T 477/638* (2015.01); *Y10T 477/6433* (2015.01)

(58) Field of Classification Search
  CPC .... F16D 2048/0245; B60W 30/18018; B60W 10/30; B60W 10/06; B60W 10/02; B60W 2710/021; B60W 2510/1005; B60W 2710/06; B60W 2710/30
  See application file for complete search history.

(56) References Cited

U.S. PATENT DOCUMENTS

| | | | |
|---|---|---|---|
| 2009/0118878 A1* | 5/2009 | Park | B60K 6/48 701/22 |
| 2012/0296509 A1* | 11/2012 | Wakita | B60W 10/06 701/22 |
| 2015/0087463 A1 | 3/2015 | Nakagawa et al. | |
| 2017/0341637 A1* | 11/2017 | Gibson | B60W 10/06 |
| 2018/0001896 A1* | 1/2018 | Gibson | F16H 59/48 |

FOREIGN PATENT DOCUMENTS

| | | |
|---|---|---|
| JP | 2008-202684 A | 9/2008 |
| WO | 2013/176208 A1 | 11/2013 |

\* cited by examiner

VEHICLE CONTROL DEVICE AND CONTROL METHOD

BACKGROUND OF THE INVENTION

1. Field of the Invention

The invention relates to a vehicle control device and a control method, and particularly relates to a vehicle control device including a dog clutch mechanism, and a control method.

2. Description of Related Art

There is a transmission that obtains a desired speed ratio by bringing each pair of gears into a power transmission state or a non-power transmission state by operating a dog clutch mechanism using a hydraulic actuator. For example, Japanese Patent Application Publication No. 2008-202684 (JP 2008-202684 A) uses a clutch that automatically performs an engagement operation in connection between the transmission described above and a driving force source such as an engine or the like using the dog clutch mechanism and the actuator that controls the dog clutch mechanism.

For example, in a vehicle including the dog clutch mechanism described in JP 2008-202684 A, the dog clutch mechanism is engaged by supplying hydraulic pressure to the hydraulic actuator from a mechanical oil pump and, when the hydraulic pressure to the hydraulic actuator reduces, the dog clutch mechanism is disengaged by a biasing force of a return spring that acts on the dog clutch mechanism.

When the driving force source is stopped or restarted in a state in which the dog clutch mechanism is disengaged, there is a possibility that the phase of a tooth on an engaging side is displaced from the phase of a tooth on an engaged side in the dog clutch mechanism by vibrations caused by the stop operation or the restart operation. The tips of the teeth are brought into contact with each other due to the displacement of the phases between the engaging tooth and the engaged tooth and, when a sleeve is moved to an engaging side with the displaced phases, there is a possibility that an engagement failure in which the tips of teeth are brought into contact with each other and the dog clutch cannot be engaged, i.e., what is called up-lock occurs.

SUMMARY OF THE INVENTION

An object of the invention is to provide a control device capable of preventing the occurrence of the up-lock and executing power transmission quickly when the engagement operation of the dog clutch mechanism is performed in the vehicle including the dog clutch mechanism, and a control method.

A vehicle control device as a first aspect of the invention (a) includes a power transmission path in which a driving force is transmitted from an engine to a wheel, a dog clutch mechanism disposed in the power transmission path, a hydraulic actuator operating the dog clutch mechanism, and an electric oil pump supplying hydraulic pressure to the hydraulic actuator. The control device includes a controller, and the controller (b) drives the electric oil pump at a time during an engine stop operation, supplies the hydraulic pressure to the hydraulic actuator, engages the dog clutch mechanism, and stops rotation of the engine in a state in which the dog clutch mechanism is engaged, and (c) drives the electric oil pump at a time during an engine restart operation, supplies the hydraulic pressure to the hydraulic actuator, engages the dog clutch mechanism, and starts the rotation of the engine in the state in which the dog clutch mechanism is engaged.

According to the first aspect of the invention, since the dog clutch mechanism is engaged when the rotation of the engine is stopped and when the rotation of the engine is restarted, it is possible to prevent the occurrence of the up-lock resulting from displacement of the phase of the teeth in the dog clutch mechanism caused by vibrations at the time of the stop/restart of the engine, and execute the power transmission quickly.

In the first aspect of the invention, (a) the vehicle may include a mechanical oil pump that is rotationally driven by the driving force of the engine, (b) the hydraulic actuator may be supplied with the hydraulic pressure from the mechanical oil pump and thereby operate the dog clutch mechanism, and (c) the electric oil pump may supply the hydraulic pressure compensating for a reduction of the hydraulic pressure supplied to the hydraulic actuator from the mechanical oil pump resulting from the engine stop operation to the hydraulic actuator to thereby maintain the hydraulic actuator such that the dog clutch mechanism is engaged.

According to the first aspect, by compensating for the reduction of the hydraulic pressure supplied to the hydraulic actuator from the mechanical oil pump resulting from the engine stop operation by using the hydraulic pressure supplied from the electric oil pump, it is possible to maintain the hydraulic actuator such that the dog clutch mechanism is engaged. In addition, since the electric oil pump is driven so as to compensate for the reduction of the hydraulic pressure supplied to the hydraulic actuator from the mechanical oil pump, the required driving amount of the electric oil pump is small, and it is possible to suppress fuel consumption by driving the electric oil pump.

Further, in the first aspect of the invention, the controller may stop the driving of the electric oil pump after the rotation of the engine is stopped, and start the driving of the electric oil pump before the rotation of the engine is started. With this arrangement, during a time period from the stop of the rotation of the engine to the restart of the engine, i.e., during a time period when the supply of the hydraulic pressure is not required, the electric oil pump is not driven. As a result, less electric power for driving the electric oil pump is required, which leads to an improvement in fuel efficiency.

In addition, in the first aspect of the invention, the power transmission path may include: a first power transmission path in which the driving force from the engine is transmitted to the wheel via a continuously variable transmission; a second power transmission path in which the driving force is transmitted to the wheel at the time of a vehicle start via a starting gear mechanism without using the first power transmission path; and a clutch that alternatively switches between the first power transmission path and the second power transmission path, and the dog clutch mechanism may be the clutch disposed in the second power transmission path. With this arrangement, the up-lock in the engagement operation of the dog clutch mechanism is prevented at the time of the vehicle start. As a result, since the up-lock does not occur when the dog clutch mechanism is engaged, it is possible to execute the power transmission at the time of the vehicle start quickly.

A control method for a vehicle as a second aspect of the invention is applied to a vehicle including a dog clutch mechanism disposed in a power transmission path in which a driving force is transmitted from an engine to a wheel and operated by a hydraulic actuator and an electric oil pump supplying hydraulic pressure to the hydraulic actuator. The control method includes the steps of (a) driving the electric oil pump at a time during an engine stop operation, supplying the hydraulic pressure to the hydraulic actuator, engaging the dog clutch mechanism, and stopping rotation of the engine in a state in which the dog clutch mechanism is engaged, and (b) driving the electric oil pump at a time during an engine restart operation, supplying the hydraulic pressure to the hydraulic actuator, engaging the dog clutch mechanism, and starting the rotation of the engine in the state in which the dog clutch mechanism is engaged.

According to the second aspect of the invention, since the dog clutch mechanism is engaged when the rotation of the engine is stopped and when the rotation of the engine is restarted, it is possible to prevent the occurrence of the up-lock resulting from the displacement of the phase of the teeth in the dog clutch mechanism caused by vibrations at the time of the stop/restart of the engine, and execute the power transmission quickly.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Figure 5:
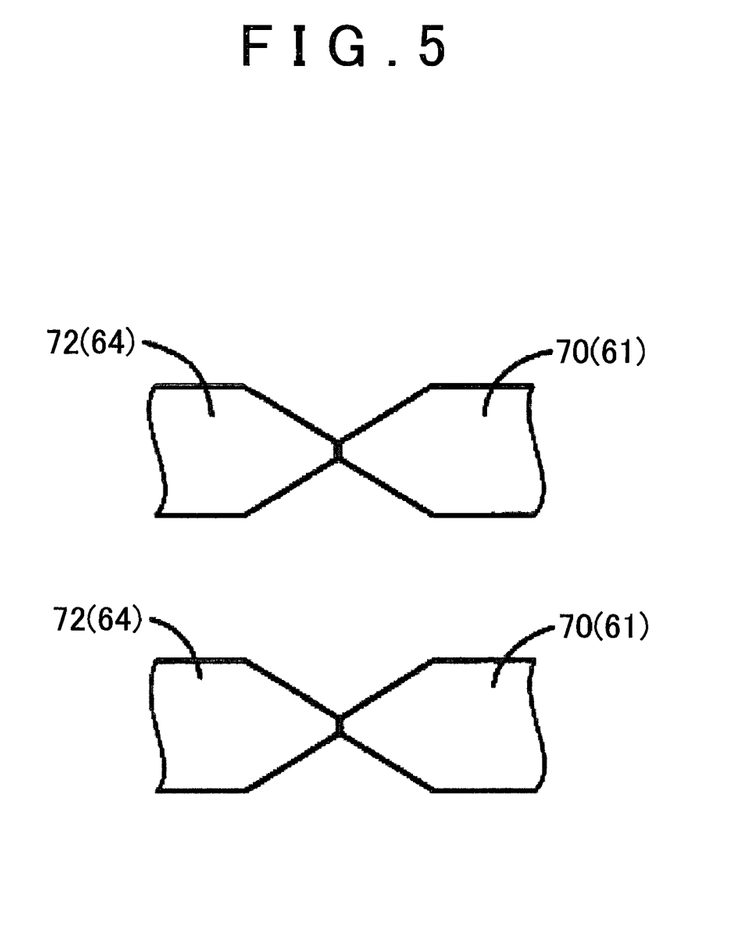
FIG. 5 is a view for explaining a state in which up-lock occurs in the synchromesh mechanism of FIG. 1.

In the invention, up-lock preferably corresponds to a state in which, as shown in FIG. 5, the tip of a spline tooth 70 (61) formed in a sleeve constituting a synchromesh mechanism is in contact with the tip of a spline tooth 72 (64) formed in a synchronizer ring, and a dog clutch D1 cannot be engaged.

Hereinbelow, an embodiment of the invention will be described in detail with reference to the drawings. Note that, in the following embodiment, the figures are simplified or deformed as needed and portions are not necessarily precisely depicted in terms of dimension ratio, shape, etc.

Figure 1:
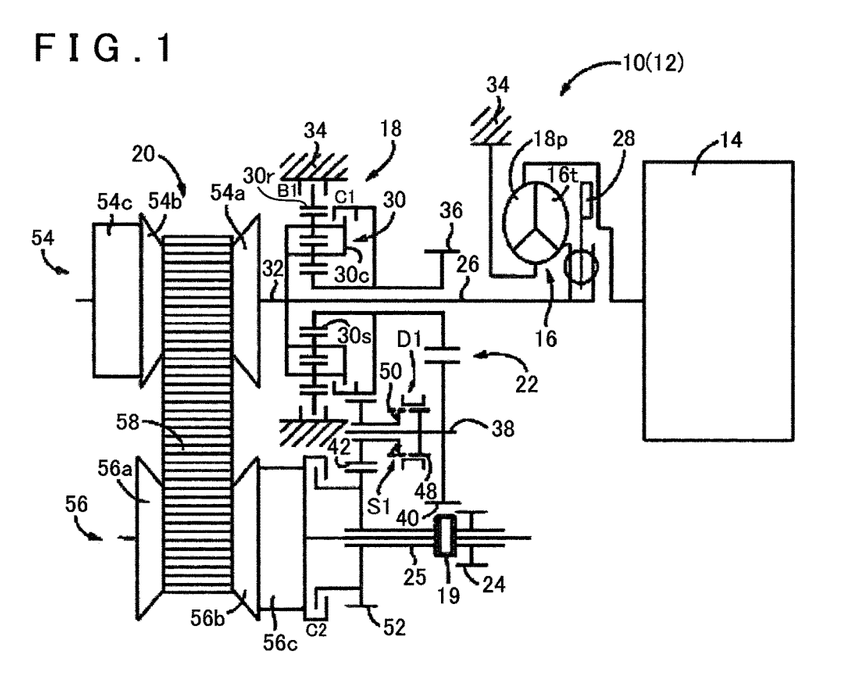
FIG. 1 is a schematic diagram for explaining the schematic configuration of a drive device provided in a vehicle as an embodiment of the invention.

FIG. 1 is a schematic diagram for explaining the schematic configuration of a drive device 12 provided in a vehicle 10 as an embodiment of the invention. The drive device 12 includes an engine 14 that is used as, e.g., a driving force source for the vehicle, a torque converter 16 as a fluid power transmission device, a forward-reverse switching device 18, a belt type continuously variable transmission 20 (hereinafter referred to as a continuously variable transmission 20), a gear mechanism 22, and an output shaft 25 formed with an output gear 24 capable of transmitting power to a drive wheel that is not shown. The drive device 12 includes, in parallel, a first power transmission path in which a torque (driving force) outputted from the engine 14 is inputted to a turbine shaft 26 via the torque converter 16, and the torque is transmitted to the output shaft 25 via the gear mechanism 22 or the like from the turbine shaft 26, and a second power transmission path in which the torque inputted to the turbine shaft 26 is transmitted to the output shaft 25 via the continuously variable transmission 20, and is capable of switching the power transmission path in accordance with the running state of the vehicle 10. Note that the turbine shaft 26 may be regarded as an input shaft of an embodiment of the invention.

The engine 14 is constituted by an internal combustion engine such as, e.g., a gasoline engine or a diesel engine. The torque converter 16 includes a pump impeller 16p that is coupled to a crankshaft of the engine 14 and a turbine impeller 16t that is coupled to the forward-reverse switching device 18 via the turbine shaft 26 that corresponds to an output side member of the torque converter 16, and performs power transmission via a fluid. A mechanical oil pump 23 mounted to the turbine shaft 26 is rotated by the rotation of the turbine shaft 26, and hence it is possible to supply hydraulic pressure to a forward clutch C1, a reverse brake B1, a belt running clutch C2, and a synchromesh mechanism S1. In addition, the pump impeller 16p and the turbine impeller 16t are rotated integrally with each other.

The forward-reverse switching device 18 is constituted mainly by the forward clutch C1, the reverse brake B1, and a double-pinion type planetary gear device 30, and a carrier 30c is integrally coupled to the turbine shaft 26 of the torque converter 16 and an input shaft 32 of the continuously variable transmission 20, a ring gear 30r is selectively coupled to a housing 34 as a non-rotating member via the reverse brake B1, and a sun gear 30s is connected to a small-diameter gear 36. In addition, the sun gear 30s and the carrier 30c are selectively coupled to each other via the forward clutch C1. Each of the forward clutch C1 and the reverse brake B1 corresponds to a connecting/disconnecting device, and is a hydraulic frictional engagement device subjected to frictional engagement by an actuator. Note that the forward clutch C1 corresponds to a first clutch provided in the power transmission path between the driving force source and the sleeve of the invention.

In addition, the sun gear 30s of the planetary gear device 30 is coupled to the small-diameter gear 36 constituting the gear mechanism 22. The gear mechanism 22 includes the small-diameter gear 36 and a large-diameter gear 40 provided so as not to be rotatable relative to a counter shaft 38. An idler gear 42 is provided about the same rotation axis as that of the counter shaft 38 so as not to be rotatable relative to the counter shaft 38. Further, a dog clutch D1 that selectively connects or disconnects the counter shaft 38 to or from the idler gear 42 is provided between the counter shaft 38 and the idler gear 42. The dog clutch D1 includes a first gear 48 formed in the counter shaft 38 and a second gear 50 formed in the idler gear 42, and the counter shaft 38 and the idler gear 42 are connected to each other by the fit between the first gear 48 and the second gear 50. The dog clutch D1 further includes the synchromesh mechanism S1 (hereinafter referred to as the synchromesh mechanism S1) as a synchronization mechanism that synchronizes rotation of the counter shaft 38 and rotation of the idler gear 42 when the first gear 48 and the second gear 50 are fitted into each other.

The idler gear 42 is meshed with an input gear 52 that is larger in diameter than the idler gear 42. The input gear 52 is provided so as not to be rotatable relative to the output shaft 25 provided on a rotation axis common to a secondary pulley of the continuously variable transmission 20 described later. The output shaft 25 is disposed so as to be rotatable about the rotation axis, and the input gear 52 and the output gear 24 are provided so as not to rotatable relative to each other. With this, in the first power transmission path in which the torque of the engine 14 is transmitted to the output shaft 25 from the turbine shaft 26 via the gear mechanism 22, the forward clutch C1, the reverse brake B1, and the dog clutch D1 are disposed.

In addition, the belt running clutch C2 that selectively connects or disconnects the continuously variable transmission 20 to or from the output shaft 25 is interposed between the continuously variable transmission 20 and the output shaft 25. The second power transmission path in which the torque of the engine 14 is transmitted to the output shaft 25 via the input shaft 32 and the continuously variable transmission 20 is formed by the engagement of the belt running clutch C2. When the belt running clutch C2 is disengaged, the second power transmission path is closed, and the torque is not transmitted to the output shaft 25 from the continuously variable transmission 20. Note that the belt running clutch C2 corresponds to a second clutch that connects or disconnects the second power transmission path of an embodiment of the invention.

The continuously variable transmission 20 is provided in the power transmission path between the input shaft 32 coupled to the turbine shaft 26 and the output shaft 25, includes a primary pulley 54 (variable pulley 54) as an input side member provided in the input shaft 32 that has a variable effective diameter, a secondary pulley 56 (variable pulley 56) as an output side member that has a variable effective diameter, and a transmission belt 58 that is wound around a pair of the variable pulleys 54 and 56, and power transmission is performed via a frictional force between the pair of the variable pulleys 54 and 56 and the transmission belt 58.

The primary pulley 54 includes a fixed sheave 54a as an input side fixed rotating body that is fixed to the input shaft 32, a movable sheave 54b as an input side movable fixed body that is provided so as not to be rotatable about the shaft relative to the input shaft 32 and so as to be movable in an axial direction, and a primary side hydraulic actuator 54c that produces thrust for moving the movable sheave 54b in order to change a V groove width between the fixed sheave 54a and the movable sheave 54b. In addition, the secondary pulley 56 includes a fixed sheave 56a as an output side fixed rotating body, a movable sheave 56b as an output side movable fixed body that is provided so as not to be rotatable about the shaft relative to the fixed sheave 56a and so as to be movable in the axial direction, and a secondary side hydraulic actuator 56c that produces thrust for moving the movable sheave 56b in order to change the V groove width between the fixed sheave 56a and the movable sheave 56b.

The V groove widths of the pair of the variable pulleys 54 and 56 are changed and the winding diameter (effective diameter) of the transmission belt 58 is changed, whereby an actual speed ratio (gear ratio) $\gamma$(=input shaft rotational speed Nin/output shaft rotational speed Nout) is continuously changed. For example, when the V groove width of the primary pulley 54 is increased, the seed ratio $\gamma$ is increased. That is, the continuously variable transmission 20 is downshifted.

In addition, a parking gear 19 is formed integrally with the output shaft 25. A parking pole of a parking device (not shown) is meshed with the parking gear 19, and the output shaft 25 is thereby brought into a locked state in which the rotation of the output shaft 25 is mechanically prevented.

Figure 2:
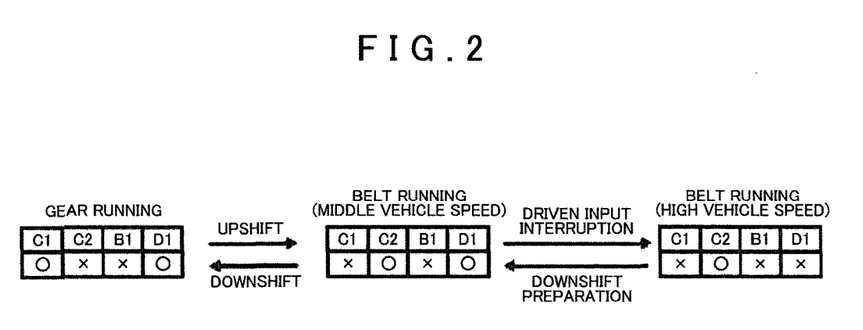
FIG. 2 is a view showing switching of a running pattern of the drive device of FIG. 1.

Hereinbelow, the operation of the drive device 12 configured as described above will be described by using engagement tables of engagement elements of running patterns shown in FIG. 2. In FIG. 2, C1 corresponds to the operating state of the forward clutch C1, C2 corresponds to the operating state of the belt running clutch C2, B1 corresponds to the operating state of the reverse brake B1, D1 corresponds to the operating state of the dog clutch D1, "o" represents engagement (connection), and "x" represents disengagement (disconnection). Note that the dog clutch D1 includes the synchromesh mechanism S1, and the synchromesh mechanism S1 is operated when the dog clutch D1 is engaged.

First, the running pattern in which the torque of the engine 14 is transmitted to the output gear 24 via the gear mechanism 22, i.e., the running pattern in which the torque is transmitted through the first power transmission path will be described. This running pattern corresponds to a gear running in FIG. 2 and, as shown in FIG. 2, the forward clutch C1 and the dog clutch D1 are engaged (connected) while the belt running clutch C2 and the reverse brake B1 are disengaged (disconnected).

The planetary gear device 30 constituting the forward-reverse switching device 18 is integrally rotated by the engagement of the forward clutch C1, and hence the small-diameter gear 36 is rotated at the same rotational speed as that of the turbine shaft 26. In addition, the small-diameter gear 36 is meshed with the large-diameter gear 40 provided in the counter shaft 38, and hence the counter shaft 38 is rotated similarly. Further, the dog clutch D1 is engaged, and hence the counter shaft 38 is connected to the idler gear 42. The idler gear 42 is meshed with the input gear 52, and hence the output shaft 25 provided integrally with the input gear 52 and the output gear 24 are rotated. Thus, when the forward clutch C1 and the dog clutch D1 disposed in the first power transmission path are engaged, the torque of the engine 14 is transmitted to the output shaft 25 and the output gear 24 via the torque converter 16, the turbine shaft 26, the forward-reverse switching device 18, the gear mechanism 22, and the idler gear 42.

Next, the running pattern in which the torque of the engine 14 is transmitted to the output gear 24 via the continuously variable transmission 20 will be described. This running pattern corresponds to a belt running (high vehicle speed) in FIG. 2 and, as shown in the belt running in FIG. 2, the belt running clutch C2 is engaged while the forward clutch C1, the reverse brake B1, and the dog clutch D1 are disengaged. The secondary pulley 56 and the output shaft 25 are connected to each other by the engagement of the belt running clutch C2, and hence the secondary pulley 56, the output shaft 25, and the output gear 24 are integrally rotated. Consequently, when the belt running clutch C2 is engaged, the second power transmission path is formed, and the torque of the engine 14 is transmitted to the output gear 24 via the torque converter 16, the turbine shaft 26, the input shaft 32, the continuously variable transmission 20, and the output shaft 25. At this point, the dog clutch D1 is disengaged (disconnected) during the belt running in which the torque of the engine 14 is transmitted via the second power transmission path in order to eliminate drag of the gear mechanism 22 or the like during the belt running and prevent an increase in the rotation of the gear mechanism 22 or the like at the high vehicle speed.

The gear running is selected in a low vehicle speed region. A speed ratio $\gamma 1$ (input shaft rotational speed Nin/output shaft rotational speed Nout) based on the first power transmission path is set to a value larger than a maximum speed ratio $\gamma$max of the continuously variable transmission 20. That is, the speed ratio $\gamma 1$ is set to a value that is not set in the continuously variable transmission 20. When it is determined that the running pattern is switched to the belt running due to, e.g., an increase in vehicle speed V, the running pattern is switched to the belt running. Herein, at the time of switching from the gear running to the belt running (high vehicle speed) or switching from the belt running (high vehicle speed) to the gear running, the switching is performed via the belt running (middle vehicle speed) in FIG. 2 transiently.

For example, in the case where the gear running is switched to the belt running (high vehicle speed), the state corresponding to the gear running in which the forward clutch C1 and the dog clutch D1 are engaged is transiently switched to the state in which the belt running clutch C2 and the dog clutch D1 are engaged. That is, engagement switching from the forward clutch C1 to the belt running clutch C2 is started. At this point, the power transmission path is switched from the first power transmission path to the second power transmission path, and upshift is substantially performed in the drive device 12. Subsequently, after the power transmission path is switched, the dog clutch D1 is disengaged (disconnected) in order to prevent the unnecessary drag and the increase in the rotation of the gear mechanism 22 or the like (driven input interruption).

In the case where the belt running (high vehicle speed) is switched to the gear running, the state in which the belt running clutch C2 is engaged is transiently switched to the state in which the dog clutch D1 is engaged as a preparation to switching to the gear running (downshift preparation). At this point, the rotation is also transmitted to the sun gear 30s of the planetary gear device 30 via the gear mechanism 22, and the engagement switching from the belt running clutch C2 to the forward clutch C1 (the forward clutch C1 is engaged and the belt running clutch C2 is disengaged) is executed in this state, whereby the power transmission path is switched from the second power transmission path to the first power transmission path. At this point, downshift is substantially performed in the drive device 12.

Incidentally, the gear running is performed instead of the belt running at the time of start of the vehicle, and hence the state in which the dog clutch D1 is disengaged such as a state in a neutral position or a parking position is switched to the state corresponding to the gear running in which the dog clutch D1 is engaged. In this case, the rotation is transmitted also to the sun gear 30s of the planetary gear device 30 via the gear mechanism 22, and the engagement of the forward clutch C1 and the disengagement of the belt running clutch C2 are executed in this state, whereby the power transmission path is switched from the second power transmission path to the first power transmission path.

Figure 3A:
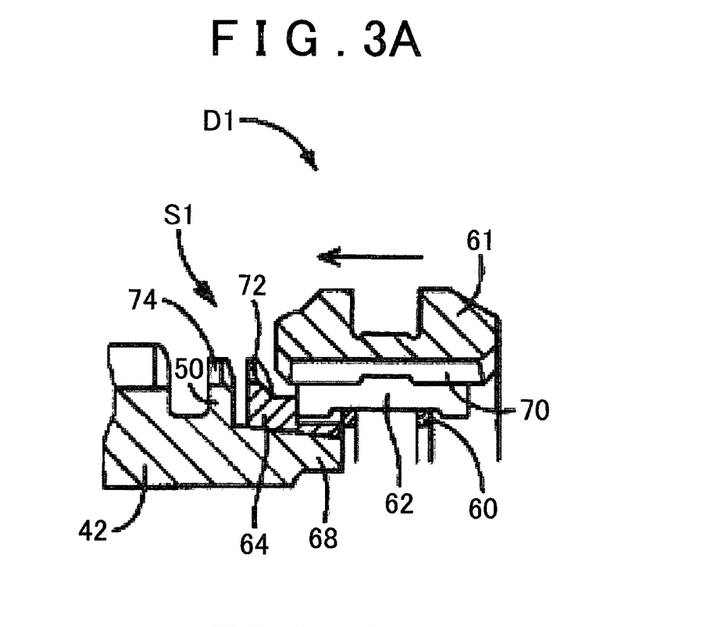
FIGS. 3A and 3B are views for explaining the configuration and operation of a synchromesh mechanism of FIG. 1.
Figure 3B:
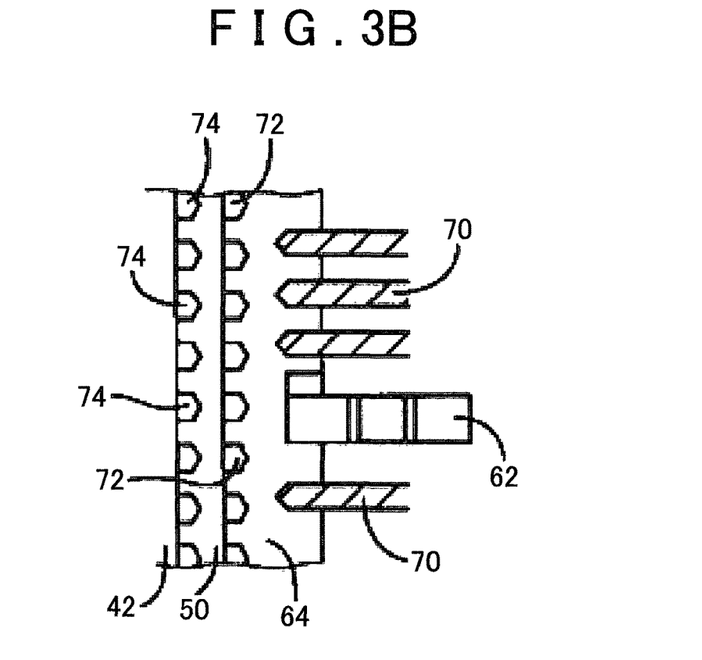
Figure 4A:
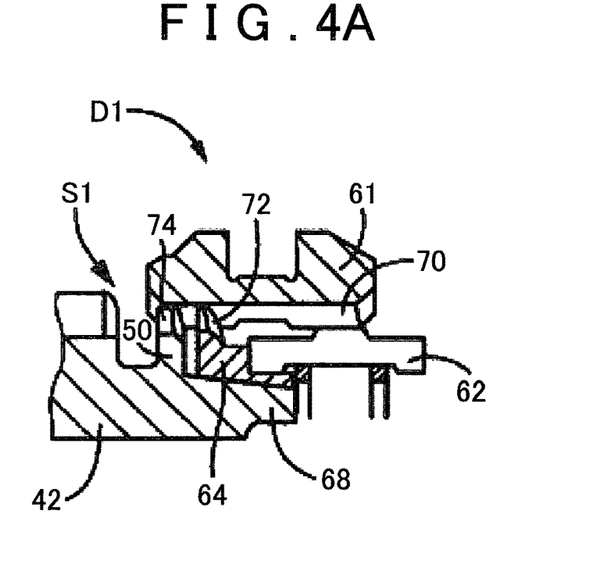
FIGS. 4A and 4B are other views for explaining the configuration and operation of the synchromesh mechanism of FIG. 1.
Figure 4B:
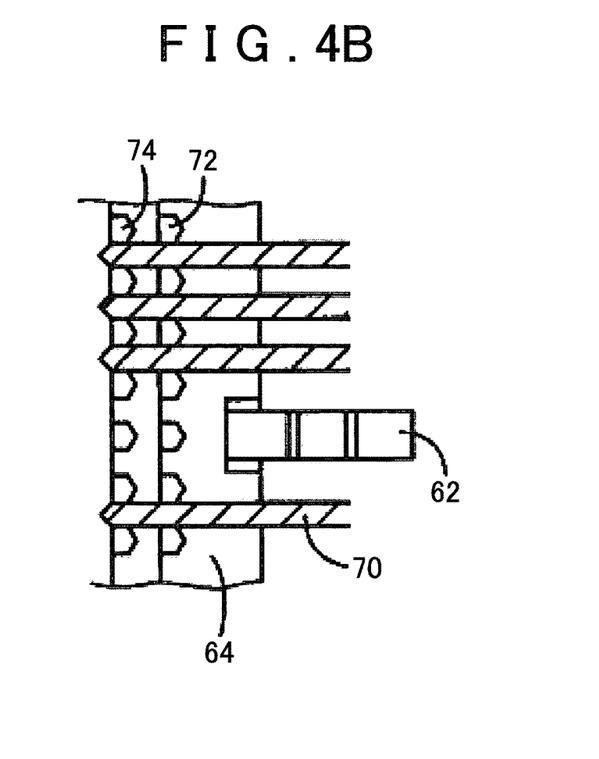

Next, the configuration and operation of each of the dog clutch D1 and the synchromesh mechanism S1 provided in the dog clutch D1 will be described in FIGS. 3A and 3B and FIGS. 4A and 4B. Note that each of FIGS. 3A and 3B shows the state in which the dog clutch D1 is disengaged (disconnected), and each of FIGS. 4A and 4B shows the state in which the dog clutch D1 is engaged (connected). Each of FIGS. 3A and 4A is a cross-sectional view of the synchromesh mechanism S1, and each of FIGS. 3B and 4B is a developed view of the state in each of FIGS. 3A and 4A except a cylindrical portion of a hub sleeve 61 when viewed from an outer peripheral side.

FIG. 3A is a view for explaining the engagement operation of the synchromesh mechanism S1. The synchromesh mechanism S1 includes the hub sleeve 61, a shifting key 62 that is engaged with the hub sleeve 61 by a key spring 60, a synchronizer ring 64 that is rotated together with the shifting key 62 in a state in which a predetermined play is provided between the shifting key 62 and the synchronizer ring 64, and a cone portion 68 provided in the vicinity of the second gear 50. Spline teeth 70 are provided in an inner peripheral surface of the hub sleeve 61, and the spline teeth 70 are spline-fitted to the first gear 48 and are always rotated integrally with the first gear 48. In addition, the hub sleeve 61 is moved by a hydraulic actuator. The hydraulic actuator is supplied with hydraulic pressure and the hub sleeve 61 is thereby moved to an engagement side, and the hub sleeve 61 is moved to a disengagement side when the supply of the hydraulic pressure is stopped.

When the hub sleeve 61 is moved to the left side in the drawing, the synchronizer ring 64 is pressed by the cone portion 68 via the shifting key 62, and power is transmitted to the second gear 50 by friction therebetween. When the hub sleeve 61 is moved further to the left, the spline teeth 70 of the hub sleeve 61 are synchronized by being pressed toward spline teeth 74 of the second gear 50 by a predetermined pressing force and, as shown in FIGS. 4A and 4B, the spline teeth 70 are meshed and engaged with spline teeth 72 provided in the synchronizer ring 64 and the spline teeth 74 provided in the second gear 50. With this, the first gear 48 and the second gear 50 are integrally connected to each other, and the power transmission path between the forward-reverse switching device 18 and the output gear 24 is formed. Note that the hub sleeve 61 is a member constituting the dog clutch D1, but the synchronization progresses when the shifting key 62 is pressed and the spline teeth 70 of the hub sleeve 61 and the spline teeth 74 of the second gear 50 are pushed against each other, and hence the hub sleeve 61 is also one of members constituting the synchromesh mechanism S1.

Figure 6:
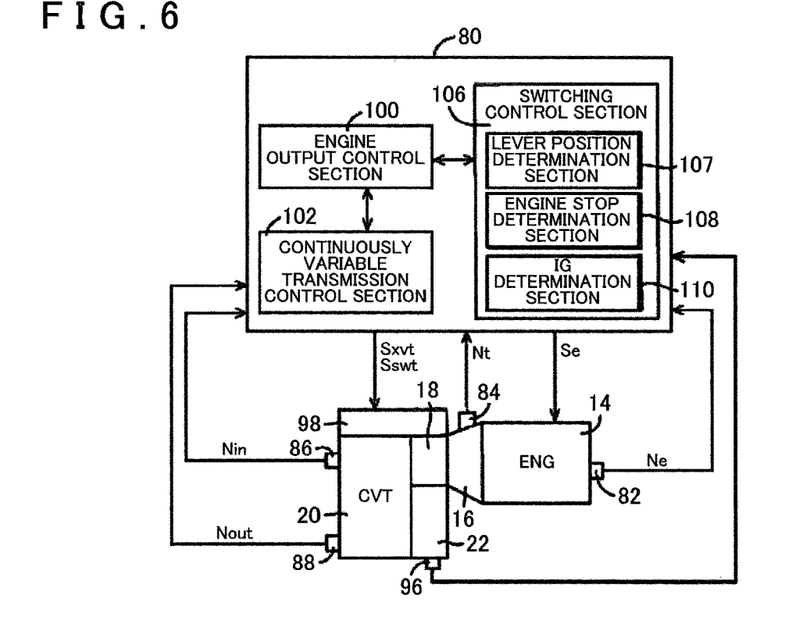
FIG. 6 is a functional block diagram for explaining a principal portion of an electronic control device that controls the drive device of FIG. 1.

FIG. 6 is a functional block diagram for explaining input/output systems of an electronic control device 80 provided in the vehicle 10 in order to control the engine 14 and the continuously variable transmission 20, and also explaining the principal portion of control functions of the electronic control device 80. The electronic control device 80 includes what is called a microcomputer provided with, e.g., a central processing unit (CPU), a random access memory (RAM), a read only memory (ROM), and an input/output interface, and the CPU performs signal processing according to programs stored in advance in the ROM while using a temporary storage function of the RAM to thereby execute various control operations of the vehicle 10. For example, the electronic control device 80 executes output control of the engine 14, gear shift control and belt gripping pressure control of the continuously variable transmission 20, and control in which the running pattern is switched between the gear running by the gear mechanism 22 and the belt running by the continuously variable transmission 20, and is configured by being divided into separate portions for engine control, continuously variable transmission control, and running pattern switching on an as needed basis.

To the electronic control device 80, signals indicative of a rotation angle (position) Acr of the crankshaft and a rotational speed (engine rotational speed) Ne of the engine 14 detected by an engine rotational speed sensor 82, a signal indicative of a rotational speed (turbine rotational speed) Nt of the turbine shaft 26 detected by a turbine rotational speed sensor 84, a signal indicative of an input shaft rotational speed Nin as the rotational speed of the input shaft 32 (primary pulley 54) of the continuously variable transmission 20 detected by an input shaft rotational speed sensor 86, a signal indicative of an output shaft rotational speed Nout as the rotational speed of the secondary pulley 56 of the continuously variable transmission 20 corresponding to the vehicle speed V detected by an output shaft rotational speed sensor 88, and a signal indicative of a lever position (operation position) Psh of a shift lever detected by a lever position sensor 96 are supplied. The electronic control device 80 successively calculates, e.g., the actual speed ratio γ(=Nin/Nout) of the continuously variable transmission 20 based on the output shaft rotational speed Nout and the input shaft rotational speed Nin.

In addition, from the electronic control device 80, for example an engine output control command signal Se for the output control of the engine 14, a hydraulic control command signal Scvt for hydraulic control related to gear shift of the continuously variable transmission 20, and a hydraulic control command signal Sswt for controlling the forward-reverse switching device 18 (the forward clutch C1 and the reverse brake B1), the belt running clutch C2, and the dog clutch D1 related to switching of the running pattern of the drive device 12 are outputted. Specifically, an engine output control section 100 outputs a throttle signal for driving a throttle actuator to control opening and closing of an electronic throttle valve, an injection signal for controlling the amount of fuel injected from a fuel injection device, or an ignition timing signal for controlling an ignition timing of the engine 14 by an ignition device as the engine output control command signal Se. A continuously variable transmission control section 102 outputs a command signal for driving a linear solenoid valve (not shown) that adjusts a primary pressure Pin supplied to a primary side hydraulic actuator 54*c* or a command signal for driving a linear solenoid valve (not shown) that adjusts a secondary pressure Pout supplied to a secondary side hydraulic actuator 56*c* to a hydraulic control circuit 98 as the hydraulic control command signal Scvt. Further, a switching control section 106 outputs a command signal for driving an electric oil pump that supplies the hydraulic pressure to the forward clutch C1, the reverse brake B1, the belt running clutch C2, and the synchromesh mechanism S1 to the hydraulic control circuit 98 as the hydraulic control command signal Sswt.

The switching control section 106 executes, for example, the switching control that switches between the gear running by the first power transmission path in which the torque of the engine 14 is transmitted to the output gear 24 via the gear mechanism 22 and the belt running by the second power transmission path in which the torque of the engine 14 is transmitted to the output gear 24 via the continuously variable transmission 20, based on the running state of the vehicle 10. In addition, the switching control section 106 functionally includes a lever position determination section 107, an engine stop determination section 108, and an IG determination section 110.

The lever position determination section 107 determines the shift position of the shift lever based on the signal Psh indicative of the lever position of the shift lever detected by the lever position sensor 96. For example, the lever position determination section 107 determines the current shift position based on the operation position of the shift lever operated by a driver, and outputs the determination result. Herein, when the shift position determined by the lever position determination section 107 is a parking position P, the switching control section 106 outputs a command for engaging the synchromesh mechanism S1, and drives the electric oil pump.

The engine stop determination section 108 detects the engine rotational speed Ne, and determines whether or not the engine rotational speed Ne is not more than a predetermined engine stop determination threshold value. For example, when the engine rotational speed Ne is not more than a predetermined rotational speed Nth, the engine stop determination section 108 determines that the engine 14 is stopped, and the switching control section 106 outputs a command for stopping the driving of the electric oil pump 24.

In the case where the IG determination section 110 determines that an ignition key is operated by, e.g., a driver and IGON is determined, the IG determination section 110 causes the switching control section 106 to output the command for engaging the synchromesh mechanism S1, and the electric oil pump 24 is driven.

Figure 7A:
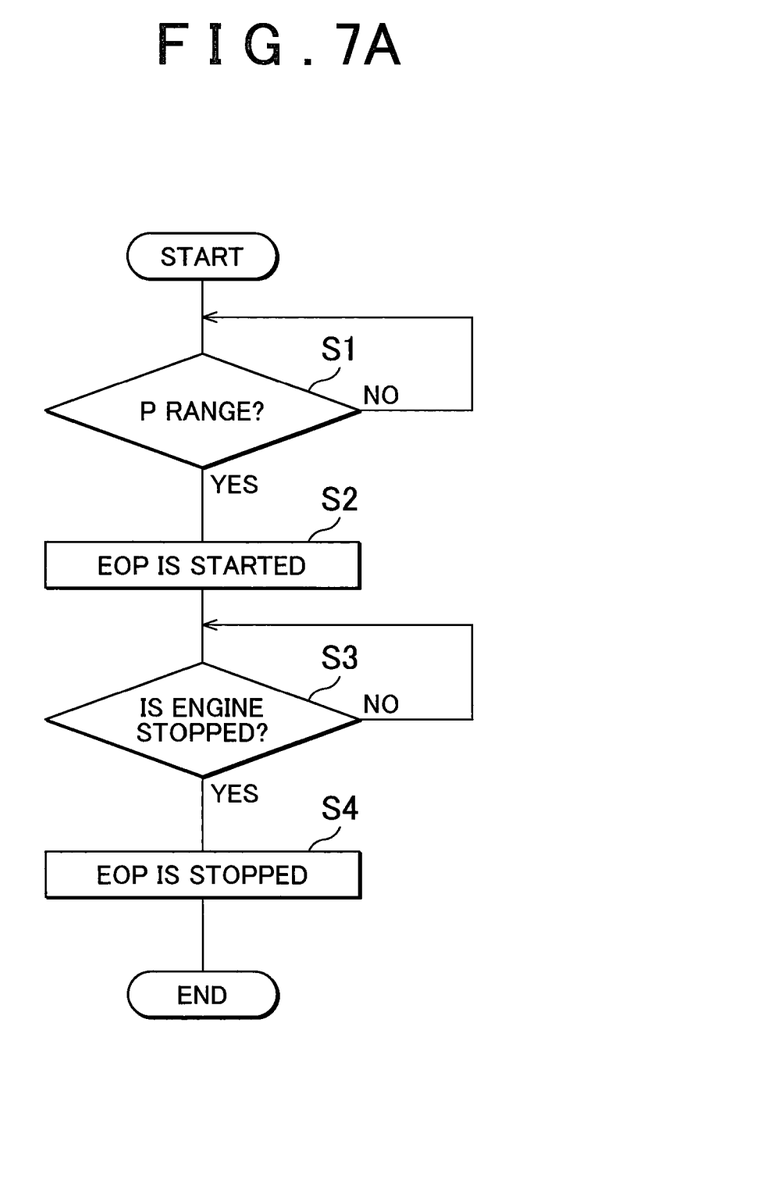
FIG. 7A is a control flowchart in which an electric oil pump is stopped based on an engine stop.
Figure 7B:
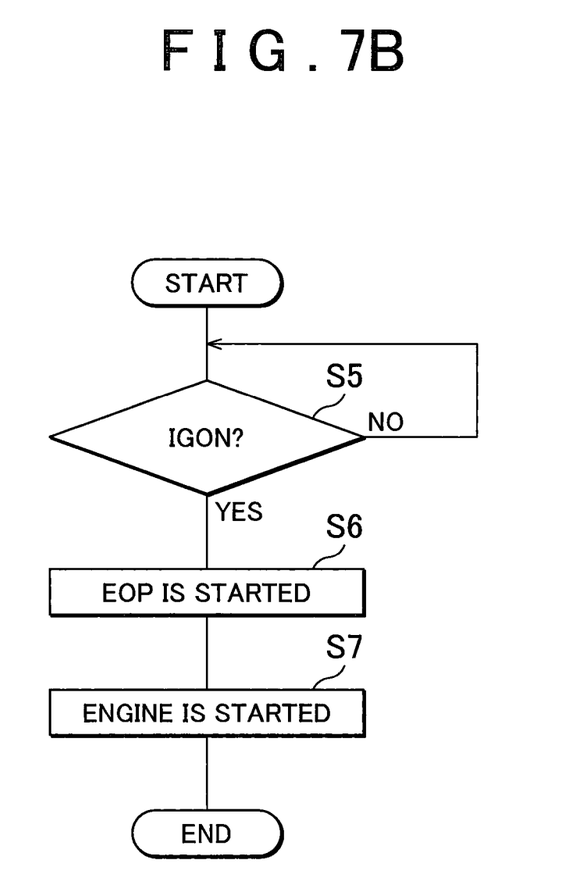
FIG. 7B is a control flowchart in which the electric oil pump is started before an engine restart.

Each of FIGS. 7A and 7B is a flowchart for explaining the principal portion of the control operation of the electronic control device 80, i.e., the control operation in which the dog clutch D1 is reliably engaged even in the case where the engine is restarted after being stopped. The flowchart is repeatedly executed at an extremely short cycle time of, e.g., about several msec to several tens of msec. FIG. 7A shows a control flow in which the electric oil pump 24 is stopped based on the engine stop, and FIG. 7B shows a control flow in which the electric oil pump 24 is started before the engine restart. However, the flowchart may be a flowchart in which the control flow in FIG. 7B is executed after the control flow in FIG. 7A.

First, in step S1 (hereinafter "step" will be omitted) of FIG. 7A corresponding to the lever position determination section 107, it is determined whether or not the lever position is a P range corresponding to the parking position P. In the case where S1 is negative, the determination of S1 is repeated until S1 becomes affirmative. In the case where S1 is affirmative, i.e., in the case where the lever position determination section determines that the lever position is the parking position P, a command for starting the electric oil pump 24 is outputted from the switching control section 106 in S2, and the electric oil pump 24 is started.

After the electric oil pump 24 is started in S2, in S3 corresponding to the engine stop determination section 108, it is determined whether or not the engine 14 is stopped based on whether or not an engine rotational speed Ne is less than a predetermined value. In the case where S3 is negative, the determination of S3 is repeated until the stop determination of the engine 14 becomes affirmative. In the case where S3 is affirmative, the command for stopping the electric oil pump 24 is outputted from the switching control section 106 in S4, and the electric oil pump 24 is stopped. With this, the supply of the hydraulic pressure to the dog clutch D1 from the electric oil pump 24 is stopped, and the hydraulic pressure of the hydraulic actuator that moves the sleeve 61 of the synchromesh mechanism S1 reduces. As a result, the sleeve 61 is moved to the side where the engagement of the synchromesh mechanism S1 is released by a return spring provided in the dog clutch D1, and hence the engagement of the dog clutch D1 is released.

Next, in S5 of FIG. 7B corresponding to the IG determination section 110, it is determined whether or not the ignition key is operated by the driver and the IGON is determined. In the case where S5 is negative, S5 is repeated until the determination of the IG determination section 110 becomes affirmative. In the case where S5 is affirmative, the command for driving the electric oil pump 24 is outputted from the switching control section 106 in S6, and the electric oil pump 24 is driven. With this, the hydraulic pressure is supplied to the dog clutch D1 from the electric oil pump 24, and the hydraulic pressure is supplied to the hydraulic actuator that moves the sleeve 61 of the synchromesh mechanism S1. As a result, the hydraulic actuator moves the hub sleeve 61 to the engagement side and the hub sleeve 61 and the synchronizer ring 64 are meshed with each other so that the dog clutch D1 is engaged. Thereafter, in S7, a command for starting the engine 14 is outputted from the engine output control section 100, and the engine 14 is started.

Figure 8:
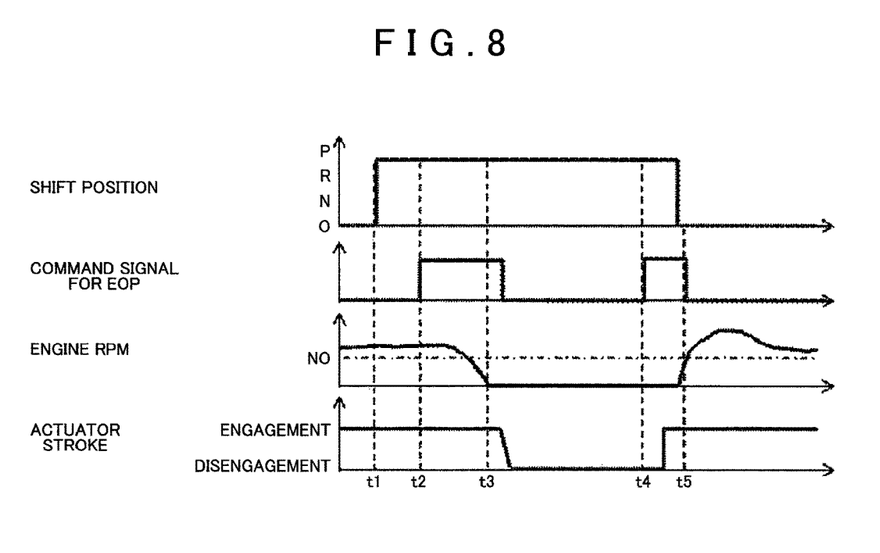
FIG. 8 is a time chart showing an operation result based on the flowcharts of FIG. 7.

FIG. 8 is a time chart showing signals detected in the electronic control device. In FIG. 8, the horizontal axis indicates time, and the vertical axis indicates, from above, the detection signal of the shift position, the command signal to the electric oil pump 24, the engine rotational speed Ne, and an actuator stroke L corresponding to the movement amount of the hub sleeve 61 of the synchromesh mechanism S1.

As shown in FIG. 8, for example, when it is determined that the shift lever is moved to the parking position P at a time point t1, the command for starting the electric oil pump 24 is outputted from the switching control section 106 at a time point t2, and the electric oil pump 24 is started. Thereafter, the command for stopping the engine 14 is outputted from the engine output control section 100, and the engine rotational speed Ne is reduced. As a result, the supply amount of the hydraulic pressure to the dog clutch D1 by the mechanical oil pump 23 is reduced, but the hydraulic pressure is supplied by the electric oil pump 24 such that the actuator stroke L of the synchromesh mechanism S1 is held at a position that allows the engagement of the synchromesh mechanism S1. Thereafter, at a time point t3, after the engine 14 is completely stopped, the command for stopping the electric oil pump 24 is outputted from the switching control section 106, and the electric oil pump 24 is stopped. With this, the supply of the hydraulic pressure to the dog clutch D1 from the electric oil pump 24 is stopped, and the hydraulic pressure of the hydraulic actuator that moves the sleeve 61 of the synchromesh mechanism S1 reduces. As a result, the sleeve 61 is moved to the side where the engagement of the synchromesh mechanism S1 is released by the return spring provided in the dog clutch D1, and hence the engagement of the dog clutch D1 is released.

At a time point t4, when an IGON signal is outputted, the command for starting the electric oil pump 24 is outputted from the switching control section 106, and the electric oil pump 24 is started. With this, the hydraulic pressure is supplied to the dog clutch D1 from the electric oil pump 24, and the hydraulic pressure is supplied to the hydraulic actuator that moves the sleeve 61 of the synchromesh mechanism S1. As a result, the hydraulic actuator moves the hub sleeve 61 to the engagement side, and the hub sleeve 61 and the synchronizer ring 64 are meshed with each other so that the dog clutch D1 is engaged. Thereafter, at a time point t5 when the command for starting the engine 14 is outputted from the engine output control section 100 and the engine rotational speed Ne exceeds a crack rotational speed N0 at which desired hydraulic pressure is supplied by the mechanical oil pump 23, the command for stopping the electric oil pump 24 is outputted from the switching control section 106, and the electric oil pump 24 is stopped.

As described above, according to the embodiment, when it is determined that the shift lever is moved to the parking position P, the command for starting the electric oil pump 24 is outputted from the switching control section 106, and the electric oil pump 24 is started. With this, even when the hydraulic pressure supplied from the mechanical oil pump 23 is reduced due to the reduction of the engine rotational speed Ne caused by the subsequent engine stop operation, the hydraulic pressure is supplied to the dog clutch D1 by the electric oil pump 24 such that the actuator stroke L is held at the position that allows the engagement of the synchromesh mechanism S1. Accordingly, the sleeve 61 is held on the engagement side by the hydraulic actuator, and the state in which the spline teeth of the synchronizer ring 64 and the spline teeth of the sleeve 61 are meshed with each other is maintained before the engine stop. As a result, when vibrations caused by the stop operation of the engine 14 occur, the spline teeth of the synchronizer ring 64 and the spline teeth of the sleeve are meshed with each other, and hence the phases of the synchronizer ring 64 and the sleeve 61 are not displaced to the phases that cause up-lock by the vibrations caused by the stop operation of the engine 14. Accordingly, it is possible to prevent the up-lock of the synchromesh mechanism S1.

In addition, after the IGON is determined by the IG determination section 110, the command for driving the electric oil pump 24 is outputted from the switching control section 106, and the electric oil pump 24 is driven. With this, the hydraulic pressure is supplied to the dog clutch D1 from the electric oil pump 24, and the hydraulic pressure is supplied to the hydraulic actuator that moves the sleeve 61 of the synchromesh mechanism S1. As a result, the hydraulic actuator moves the hub sleeve 61 to the engagement side, and the hub sleeve 61 and the synchronizer ring 64 are meshed with each other so that the dog clutch D1 is engaged. With this, when the vibrations caused by the start operation of the engine 14 occur, the spline teeth of the synchronizer ring 64 and the spline teeth of the sleeve 61 are meshed with each other, and hence the phases of the synchronizer ring 64 and the sleeve 61 are not displaced to the phases that cause the up-lock by the vibrations caused by the start operation of the engine 14. Accordingly, it is possible to prevent the up-lock of the synchromesh mechanism S1.

In addition, from the time point t3 to the time point t4 when the engine 14 is completely stopped, and after the time point t5 when the engine rotational speed Ne exceeds the crack rotational speed N0 of the mechanical oil pump 23, it is possible to suppress unnecessary power consumption and improve fuel efficiency by stopping the electric oil pump 24.

The embodiment of the invention has been described in detail based on the drawings thus far, and the invention is also applied to other aspects.

In the above embodiment, the command for stopping the electric oil pump 24 is outputted after the engine stop, but the invention is not necessarily limited to this embodiment. For example, with regard to the command for driving the electric oil pump 24, the electric oil pump 24 may be continuously driven even after the engine stop as a preparation to the engine restart after the engine stop. With this arrangement, it is possible to maintain the state in which the synchromesh mechanism S1 is engaged during a time period from the engine stop to the engine start. With this, when the vibrations caused by the engine stop operation and the engine start operation occur, since the spline teeth of the synchronizer ring 64 and the spline teeth of the sleeve 61 are meshed with each other, the phases of the synchronizer ring 64 and the sleeve 61 are not displaced to the phases that cause the up-lock by the vibrations caused by the engine stop operation and the engine start operation. Accordingly, it is possible to prevent the up-lock of the synchromesh mechanism S1.

In addition, in the above embodiment, the mechanical oil pump 23 is used during the normal running, and the hydraulic pressure is supplied by the electric oil pump 24 when the lever position determination section 107 determines that the lever position is the parking position P, but the invention is not necessarily limited to this embodiment. For example, the vehicle may also be a vehicle that includes only the electric oil pump 24 as the hydraulic pressure supply source without including the mechanical oil pump 23. In this case, during a time period when the determination of the IG determination section 110 is affirmative, a signal is outputted such that the electric oil pump 24 is always driven, and the state in which the synchromesh mechanism S1 is engaged is maintained. With this arrangement, when the vibrations caused by the engine stop operation and the engine start operation occur, since the spline teeth of the synchronizer ring 64 and the spline teeth of the sleeve 61 are meshed with each other, the phases of the synchronizer ring 64 and the sleeve 61 are not displaced to the phases that cause the up-lock by the vibrations caused by the engine stop operation and the engine start operation. Accordingly, it is possible to prevent the up-lock of the synchromesh mechanism S1.

Further, the command for driving the electric oil pump 24 may be outputted when, e.g., the engine rotational speed Ne does not exceed the crack rotational speed N0 of the mechanical oil pump 23, and the electric oil pump 24 may be driven at the same time as the reduction of the hydraulic pressure supplied by the mechanical oil pump 23.

In addition, in the above embodiment, the electric oil pump 24 is started when the lever position determination section 107 determines that the lever position is the parking position, but the invention is not necessarily limited to this embodiment. For example, the electric oil pump 24 may be started when the lever position is the neutral position, the electric oil pump 24 may also be started based on an ON operation of an emergency brake by a driver, an operation of auxiliary equipment during engine automatic stop control, position information on the vehicle 10, the vehicle speed, a travel distance, or a brake pedal depression amount, and the electric oil pump 24 may also be started by combining the above operations and the obtained information.

Further, in the above embodiment, the electronic control device 80 is configured by separate portions which perform respective controls according to different uses such as the engine control, the continuously variable transmission control, and the running pattern switching, but the electronic control device 80 does not necessarily need to be configured by separate control portions, and the respective controls may be executed by one electronic control device.

In addition, the above embodiment is applied to the drive device 12 in which the continuously variable transmission 20 and the gear mechanism 22 are provided in parallel and the power transmission path is switched according to the running state, but the invention of the application is not limited to the above drive device 12, and can be applied to a hydraulic dog clutch as needed. Accordingly, for example, the dog clutch may also be a dog clutch that does not include the synchromesh mechanism.

Further, in the above embodiment, the gear mechanism 22 is a mechanism having one speed ratio, but the gear mechanism 22 may also be a mechanism that has two or more speed ratios and is capable of gear shift appropriately.

In addition, in the above embodiment, the continuously variable transmission 20 is constituted by the belt type continuously variable transmission, but the continuously variable transmission 20 may also be constituted by, e.g., a toroidal type continuously variable transmission.

The embodiment described above is only an embodiment and the invention may be implemented in an aspect having various modifications and improvements made based on the knowledge of those skilled in the art.

The invention claimed is:

1. A vehicle control device comprising:
    a power transmission path in which a driving force is transmitted from an engine to a wheel;
    a dog clutch mechanism disposed in the power transmission path;
    a hydraulic actuator operating the dog clutch mechanism;
    an electric oil pump supplying hydraulic pressure to the hydraulic actuator; and
    a controller
    (a) driving the electric oil pump at a time during an engine stop operation, supplying the hydraulic pressure to the hydraulic actuator, engaging the dog clutch mechanism, and stopping rotation of the engine in a state in which the dog clutch mechanism is engaged, and
    (b) driving the electric oil pump at a time during an engine restart operation, supplying the hydraulic pressure to the hydraulic actuator, engaging the dog clutch mechanism, and starting the rotation of the engine in the state in which the dog clutch mechanism is engaged.

2. The vehicle control device according to claim 1 wherein
    the vehicle includes a mechanical oil pump that is rotationally driven by the driving force of the engine,
    the hydraulic actuator is supplied with the hydraulic pressure from the mechanical oil pump to operate the dog clutch mechanism, and
    the electric oil pump supplies the hydraulic pressure compensating for a reduction of the hydraulic pressure supplied to the hydraulic actuator from the mechanical oil pump resulting from the engine stop operation, to the hydraulic actuator, so as to maintain the hydraulic actuator such that the dog clutch mechanism is engaged.

3. The vehicle control device according to claim 1 wherein
    the controller (a) stops the driving of the electric oil pump after the rotation of the engine is stopped (S3, S4), and (b) starts the driving of the electric oil pump before the rotation of the engine is started (S6, S7).

4. The vehicle control device according to claim 1 wherein
    the power transmission path includes: a first power transmission path in which the driving force from the engine is transmitted to a wheel via a continuously variable transmission; a second power transmission path in which the driving force is transmitted to the wheel at the time of a vehicle start via a starting gear mechanism without using the first power transmission path; and a clutch that alternatively switches between the first power transmission path and the second power transmission path, and the dog clutch mechanism is the clutch disposed in the second power transmission path.

5. A control method for a vehicle including a dog clutch mechanism disposed in a power transmission path in which a driving force is transmitted from an engine to a wheel and operated by a hydraulic actuator and an electric oil pump supplying hydraulic pressure to the hydraulic actuator, the control method comprising:
- (a) driving the electric oil pump at a time during an engine stop operation, supplying the hydraulic pressure to the hydraulic actuator, engaging the dog clutch mechanism, and stopping rotation of the engine in a state in which the dog clutch mechanism is engaged; and
- (b) driving the electric oil pump at a time during an engine restart operation, supplying the hydraulic pressure to the hydraulic actuator, engaging the dog clutch mechanism, and starting the rotation of the engine in the state in which the dog clutch mechanism is engaged.

* * * * *

UNITED STATES PATENT AND TRADEMARK OFFICE
CERTIFICATE OF CORRECTION

PATENT NO. : 10,118,619 B2
APPLICATION NO. : 15/507455
DATED : November 6, 2018
INVENTOR(S) : Kenji Matsuo et al.

It is certified that error appears in the above-identified patent and that said Letters Patent is hereby corrected as shown below:

On the Title Page

Item (71), change "JODOSHA" to --JIDOSHA--

Item (30), change "2014-1785852" to --2014-175852--

Signed and Sealed this
Twenty-ninth Day of January, 2019

Andrei Iancu
*Director of the United States Patent and Trademark Office*